United States Patent [19]

Gurney

[11] 4,403,524
[45] Sep. 13, 1983

[54] HEADLAMP DOOR LEVER ASSEMBLY

[75] Inventor: Anthony R. Gurney, Toledo, Ohio

[73] Assignee: Donovan Wire & Iron Co., Toledo, Ohio

[21] Appl. No.: 289,725

[22] Filed: Aug. 3, 1981

[51] Int. Cl.³ ............................................. G05G 5/18
[52] U.S. Cl. ........................................ 74/538; 49/357
[58] Field of Search .................... 49/357, 324, 325; 74/535, 536, 537, 538

[56] References Cited

U.S. PATENT DOCUMENTS

| 1,497,609 | 6/1924 | Sturges | 49/357 X |
| 2,162,052 | 6/1939 | Bird | 74/537 X |
| 3,625,087 | 12/1971 | Flory et al. | 74/518 |
| 4,212,211 | 7/1980 | Rickert | 74/538 |

FOREIGN PATENT DOCUMENTS 403546 9/1969 Australia .............................. 74/538

Primary Examiner—Kenneth Downey
Attorney, Agent, or Firm—Wilson, Fraser, Barker & Clemens

[57] ABSTRACT

The present invention relates to a hand-actuated lever assembly for mechanical linkage to and operation of a vehicle headlamp door mechanism. The lever assembly comprises a handle and a lever mechanism which are pivotally mounted to an anchored support plate, but are otherwise structurally independent from one another. The handle is adapted to engage a stop member on the lever mechanism for pivoting the handle and the lever mechanism to an operating position. The lever mechanism is mechanically coupled to the headlamp door mechanism such that operation of the handle results in pivoting of the lever mechanism and operation of the door mechanism. The lever mechanism is provided with a releasable lock for maintaining the lever mechanism in the operating position. A spring is provided to bias the handle in a non-operating direction such that, after the lever mechanism is pivoted to the operating position the handle will automatically return to a horizontal, non-operating position while the lever mechanism remains in the operating position. The handle includes a disengaging mechanism for use when it is desired to return the headlamp door mechanism to the non-operating position.

7 Claims, 5 Drawing Figures

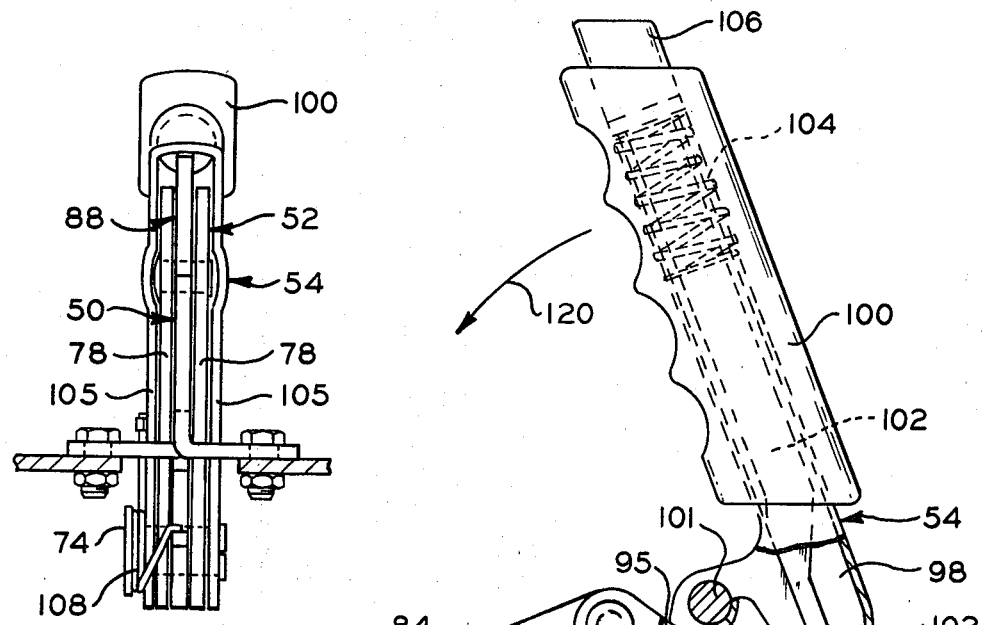
FIG. 3
FIG. 4
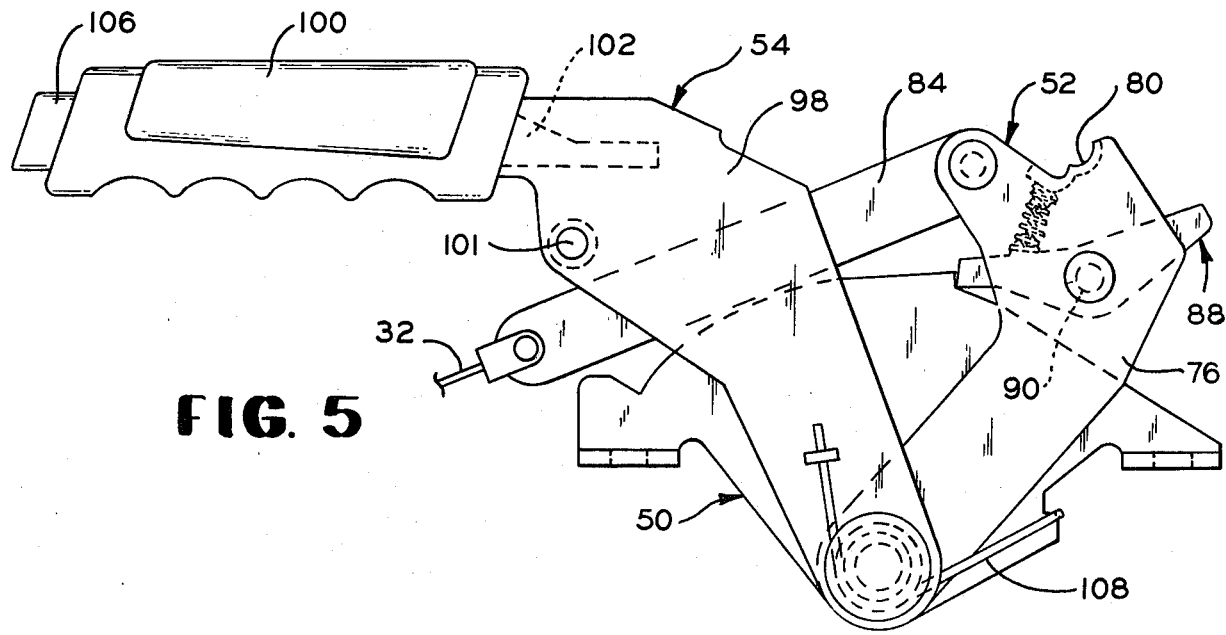
FIG. 5

HEADLAMP DOOR LEVER ASSEMBLY

BACKGROUND OF THE INVENTION

The present invention relates generally to a hand-actuated lever assembly, and more specifically to a hand-actuated lever assembly which is intended for use in motor vehicles.

Motor vehicles typically utilize a hand actuated lever assembly as one means for operating a remote brake mechanism. Such lever assemblies typically include an actuating handle which, when moved to an operating position, projects upwardly into the passenger space of the vehicle. Since such protrusion of the brake handle into the passenger compartment can present an annoying obstacle in entering and exiting the car, most cars having front bucket seats utilize a hand brake lever assembly which is positioned between the driver's and passenger's seats. In automobiles with bench-type front seats, the placement of a hand brake lever assembly is essentially limited to the door side of the driver's seat. Consequently, those cars generally incorporate foot-operated parking brake assemblies.

An improvement of the above-described conventional hand actuated parking brake lever assemblies is disclosed in U.S. Pat. No. 4,212,211 to William Rickert. The Rickert patent discloses a hand-actuated lever assembly in which the handle is manually returnable by the operator to a non-operating, horizontal position without disengagement of the remote parking brake. The lever assembly disclosed in the Rickert patent includes a lever mechanism and a handle pivotally mounted to an anchored ratchet plate. The handle is adapted to engage a stop member mounted on one end of the lever mechanism for pivoting the handle and the lever mechanism to an operating position. The lever mechanism includes means at the opposite end for mechanical linkage to the remote brake. The lever mechanism is pivotally connected to the ratchet plate at a point intermediate the stop member and the mechanical linkage to the remote brake. Operation of the handle results in pivoting of the lever mechanism and application of the brakes.

While the aforementioned Rickert design has proved to be outstanding in several applications, a possible problem arises in certain other applications in that the pivoted connection of the lever mechanism to the ratchet plate is located intermediate the stop member and the mechanical linkage to the remote brake. Thus, the lever mechanism must be of a sufficient length to provide ease of operation of the lever while also providing sufficient cable travel in order to operate the remote brake. Although such an assembly is very suitable for applications which require a limited amount of cable travel or in applications where the overall size of the lever assembly is not limited, such an assembly is less satisfactory in applications which require a relatively large amount of cable travel and the overall size of the lever assembly is limited.

Another possible problem associated with the Ricket lever assembly is that, although the handle is returnable to a non-operating position without disengagement of the remote mechanism, the handle must be manually returned by the operator to such non-operating position.

SUMMARY OF THE INVENTION

The present invention relates to a hand-actuated lever assembly which, in its preferred embodiment, is utilized as a means for actuating a headlamp door mechanism of a motor vehicle.

The lever assembly generally comprises a anchored support plate, a lever mechanism, and a retractable handle. The lever mechanism and the handle are pivotally mounted relative to the support plate, but are otherwise structurally independent from one another. The handle includes a drive pin adapted to engage a stop member on the lever mechanism for pivoting the handle and the lever mechanism to an operation position. The lever mechanism is mechanically coupled to a remote mechanism such that operation of the handle results in pivoting the lever mechanism and activation of the remote mechanism. In accordance with the present invention, the one end of the lever mechanism is pivoted to the support plate, while the stop member and the mechanical linkage to the remote mechanism are mounted near the opposite end. This provides a lever assembly which can obtain the maximum amount of cable travel for a given length lever.

The lever mechanism also includes a pivotally mounted pawl which is adapted to engage a projection on the support plate and maintain the lever mechanism in an operating position. In accordance with the present invention, the handle is spring biased in a non-operating direction such that, after the lever mechanism is pivoted to the operating position, the handle will automatically return to a horizontal, non-operating position while the lever mechanism remains in the operating position. Means are provided on the handle for disengaging the pawl of the lever mechanism from the projection on the support plate when it is desired to return the lever mechanism to the non-operating position.

BRIEF DESCRIPTION OF THE DRAWINGS

FIG. 3 is an end elevational view taken along line 3—3 of FIG. 2;

FIG. 4 is a side elevational view, partly in section, of the lever assembly of FIG. 2 but showing the handle and the lever mechanism in an operating position; and FIG. 5 is a side elevational view, similar to FIG. 4, but showing the handle returned to the non-operating position while the lever mechanism remains in its operating position.

DESCRIPTION OF THE PREFERRED EMBODIMENT

Figure 1:
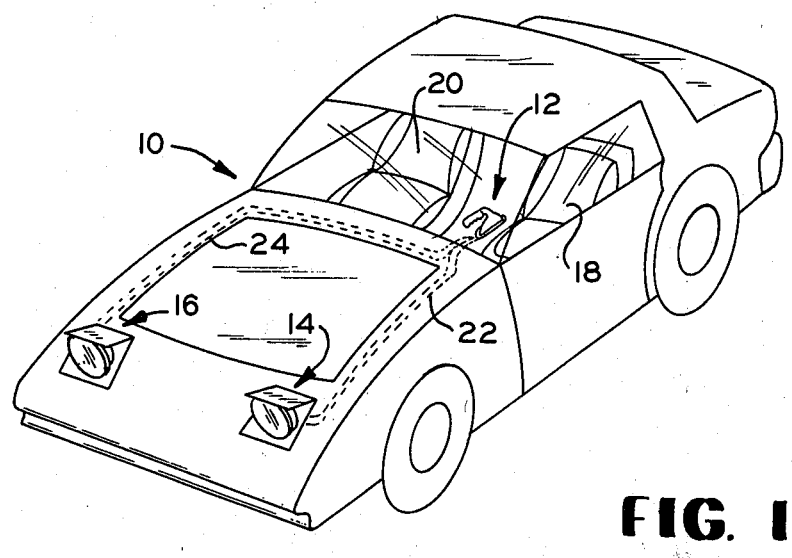
FIG. 1 is a schematic view of a motor vehicle illustrating the placement of the lever assembly according to the present invention in the vehicle along with the cable to be utilized for operating a pair of remote headlamp door mechanisms.

Referring to FIG. 1, there is generally indicated an automobile 10 which can utilize a hand actuated lever assembly 12 according to the present invention for operation of a pair of remote headlamp door mechanisms 14 and 16. In FIG. 1, the lever assembly 12 is positioned on the floor of the vehicle between a driver's seat 18 and a passenger's seat 20. The lever assembly 12 is mechanically coupled to the headlamp door mechanism 14 by means of a cable 22 and is coupled to the headlamp door mechanism 16 by means of a cable 24. Although FIG. 1 illustrates the lever assembly 12 as being positioned between the seats 18 and 20, it will be appreciated that the lever assembly could also be placed on the door side of the driver's seat 18.

Figure 2:
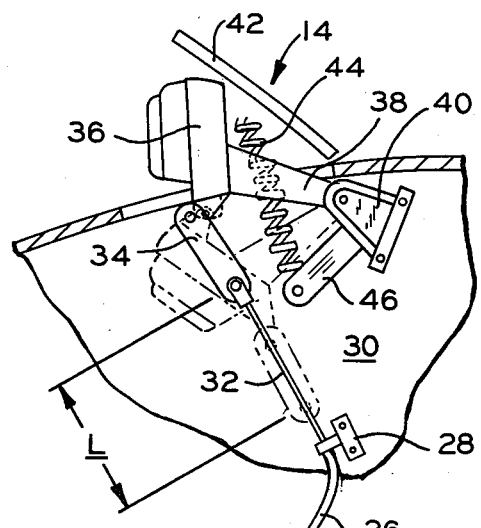
FIG. 2 is a side elevational view, partly in section, of the lever assembly and one of the headlamp door mechanisms of FIG. 1, with both the handle and the lever mechanism of the lever assembly shown in a non-operating position.
Figure 2:
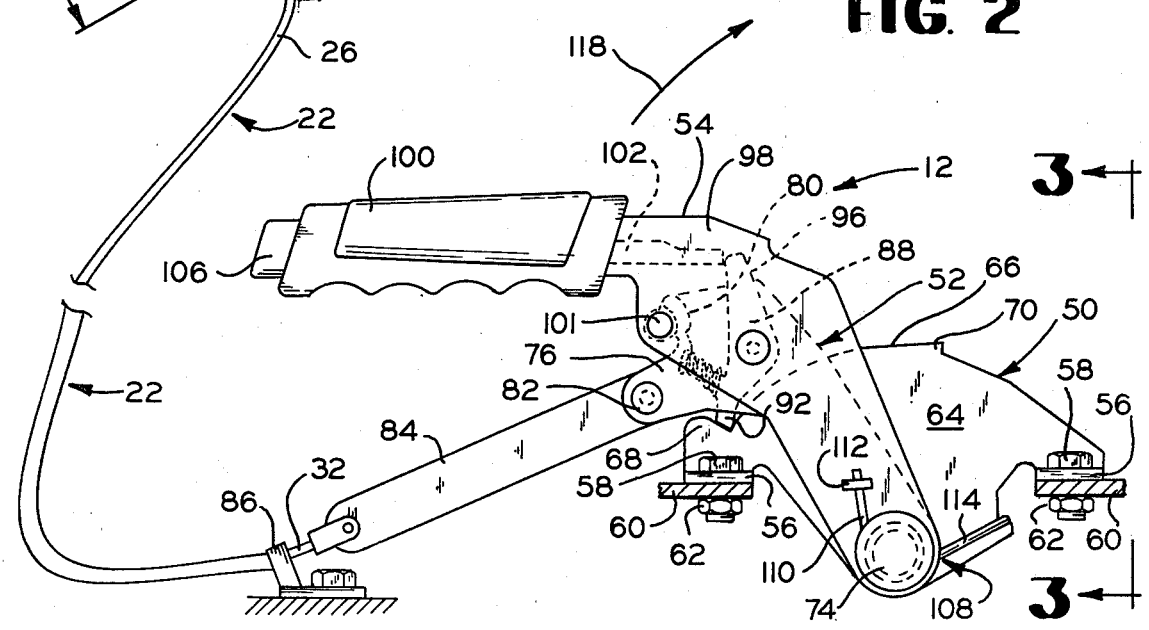

Referring to FIG. 2, there is shown a more detailed view of the headlamp door mechanism 14 along with the cable connection to the lever assembly 12. As shown in FIG. 2, the cable 22 includes a housing 26 having one end which terminates at a cable support bracket 28 securely fixed relative to a vehicle body 30. The cable includes a slidable cable wire 32 which extends outwardly from the one end the cable housing 26 and is pivotally connected to one end of an extension link 34. The other end of the extension link 34 is pivotally connected to the lower end a headlamp housing 36.

The headlamp housing 36 includes a rearwardly extending pivot arm 38 which is pivotally mounted to a support bracket 40 secured to the vehicle body 30. A headlamp door 42 is fixed to the upper end of the headlamp housing 36. The headlamp door mechanism 14 is maintained in its upper, or open, position, as shown in FIG. 2, by means of a helical compression spring 44 which extends from a suitable support at the upper end of the headlamp housing 36 to the outer end of a support arm 46 securely attached to the support bracket 40. As will be discussed, actuation of the lever assembly 12 creates sufficient tension in the cable wire 32 to overcome the upward force of the spring 44 and cause the door mechanism 14 to move to its closed position, as shown in phantom in FIG. 2.

Referring to FIGS. 2 through 5, the lever assembly 12 generally comprises a support plate 50, a lever mechanism 52, and a handle 54. The support plate 50 includes mounting flanges 56 having holes therethrough for receiving bolts 58 for securing the support plate 50 to a vehicle frame member 60 by means of threaded nut 62.

The support plate 50 includes a generally vertical main body 64 having an arcuate upper periphery 66. The upper periphery 66 has projections 68 and 70 formed thereon at predetermined locations along the periphery for defining the non-operating and operating positions respectively of the lever mechanism 52. The extreme lower end of the main body 54 has an aperture formed therein for receiving a pivot pin 74 which is utilized for pivotally mounting the lever mechanism 52 and the handle 54 relative to the support plate 50. It will be appreciated that, in some instances, it may be desirous to provide a plurality of operating positions for the lever mechanism 52. In these instances, the support plate 50 can be provided with a plurality of projections such as a sector of teeth (not shown) along its upper periphery.

The lever mechanism 52 includes a bifurcated operating lever 76 saddled over the main body 64 of the support plate 50, with each branch 78 of the lever 76 having an aperture formed at the extreme lower end thereof for receiving the pivot pin 74. The upper end of the lever 76 includes a stop member 80 and a connection point 82 for pivoted connection to one end of an extension link 84, having its opposite end connected to an end of the cable wire 32 at a cable support 86.

The lever mechanism 52 also includes a pawl 88 mounted thereon for pivotal movement about a pivot pin 90 extending through a center portion of the pawl and supported by the branches 78 of the lever 76. The pawl 88 has a first end 92 which is biased against the upper periphery 66 of the support plate 50 by means of a helical compression spring 93 supported between a projection 94 of the first end 92 of the pawl 88 and a projection 95 formed on the lower end of the stop member 80. The pawl 88 has a second end 96 which extends in a generally opposite direction from the first end 92 and, as will be discussed, is utilized to release the lever mechanism 52 from its operating position.

The handle 54 includes a bifurcated arm 98 having the lower portion thereof saddled over the lever mechanism 52 and the support plate 50. The arm 98 has a hand grip 100 positioned on one end thereof and an aperture formed through the opposite end for receiving the pivot pin 74 to pivotally mount the handle 54 to the support plate 50. A drive pin 101 is supported between the two branches 105 of the arm 98 and is adapted to engage the stop member 80 of the lever mechanism to pivot the lever mechanism to its operating position.

As shown in FIG. 4, the handle 54 also includes a push rod 102 extending through a hollow upper portion of the arm 98 and biased upwardly by means of a compression spring 104. A release button 106 is mounted on the upper end of the handle and engages the upper end of the push rod 102. The release button 106 provides a means for depressing the push rod 102 downwardly to disengage the pawl 88 from the projection 70 and thereby release the lever mechanism 52 from its operating position.

The handle 54 also includes a biasing torsion spring 108 which encompasses an end portion of the pivot pin 74 and has one end 110 fixedly attached to the handle 54 by means of a stamped opening 112 formed in the arm 98, and has the opposite end 114 securely mounted within a cutout 116 formed in the lower end of the main body 64 of the support plate 50. The torsion spring 108 functions to bias the handle 54 in the downward, non-operating position.

FIG. 2 illustrates the lever assembly 12 with both the lever mechanism 52 and the handle 54 in the non-operating position. The compression spring 44 supplies an upward force to the headlamp housing 36 sufficient to maintain the headlamp door mechanism 14 in its open position. When it is desired to close the door mechanism 14, the handle 54 is pivoted upwardly, as indicated by direction arrow 118 in FIG. 2, such that the drive pin 101 of the handle 54 abuts the stop member 80 and both the handle 54 and the lever mechanism 52 are pivoted upwardly about the support plate 50.

When the handle 54 has been pivoted upwardly sufficiently to move the first end 92 of the pawl 88 past the projection 70, the first end of the pawl 88 will be forced downwardly, and the cable wire 32 will have traveled a sufficient distance L to close the headlamp door mechanism 14. At this time, both the lever mechanism 52 and the handle 54 will be in the operating position, as shown in FIG. 4. By releasing the handle 54, the torsion spring 108 will automatically pivot the handle 54 downwardly as indicated by direction arrow 120 of FIG. 4, to its non-operating position, as shown in FIG. 5.

In FIG. 5, the handle 54 is shown in the non-operating position while the lever mechanism 52 is shown in the operating position. In order to release the locking engagement of the pawl 88 with the projection 70, the operator pivots the handle upwardly to its operating position. By pivoting the handle 54 just slightly beyond the point where the drive pin 101 abuts the stop member 80, the pawl 88 and the projection 70 become in loose engagement, and the release button 106 can be depressed to slide the push rod 102 downwardly to engage the second end 96 of the pawl 88 and counter the bias due to the compression spring 93. With the button 106 still depressed, the handle 54 can then be pivoted downwardly, and the tension created in the cable wire 32 by the force of the spring 44 of the headlamp door mechanism 14 allows the lever mechanism 52 to follow the handle 54 to the non-operating position.

It should be noted that the lever assembly according to the present invention is especially advantageous in applications which require a relatively large amount of cable travel, but where the overall size of the lever assembly is limited. By pivoting the lever mechanism to the support plate 50 at the extreme one end of the lever, and by mounting the stop member and the mechanical linkage near the opposite end, the maximum amount of cable travel is obtained for a lever having a predetermined length.

In accordance with the provisions of the patent statutes, the principle and mode of the invention have been explained and illustrated and what is considered to represent its preferred embodiment. However, it must be understood that the invention can be practiced otherwise than as specifically illustrated and described without departing from its spirit or scope.

What is claimed is:

1. A hand-actuated lever assembly for mechanical linkage to and operation of a remote mechanism, said assembly comprising:

a support plate having at least one projection formed along a portion of the periphery of said plate and means for securing said plate from movement;

a lever mechanism including an operating lever and a releasable lock, said operating lever having one end thereof pivotally mounted relative to said support plate and having both a stop means for pivoting said lever and a means for mechanical linkage to such remote mechanism mounted on the opposite distal end whereby such remote mechanism is moved to an operating position when said lever mechanism is pivoted in an operating direction, and said releasable lock including a pawl pivotally mounted to said lever mechanism and adjacent said support plate and means supported by said lever mechanism for biasing said pawl into engagement with said projection of said support plate when said lever mechanism is pivoted in an operating direction whereby said pawl maintains said lever mechanism in the operating position until disengaged;

a handle pivotally mounted relative to said support plate and including a drive member adapted to abut and drive said stop means of said lever mechanism when said handle is pivoted in an operating direction, thereby simultaneously pivoting said handle and said lever mechanism and engaging said pawl with said projection on said support plate, said handle being returnable to a non-operating position without disengaging said pawl from said projection; and means on said handle for disengaging said pawl from said projection, thereby releasing said lock and permitting said lever mechanism to return to a non-operating position.

2. A hand-actuated lever assembly according to claim 1 and further including spring means for biasing said handle in a non-operating position.

3. A hand-actuated lever assembly according to claim 1 wherein said pawl of said lever mechanism is pivotally mounted to said operating lever at a point intermediate said pivoted end and said mechanical linkage means.

4. In combinatin with a headlamp door mechanism pivotally mounted to a vehicle and movable between an operating position and a non-operating position, a hand-actuated lever assembly for mechanical linkage to and operation of said door mechanism, the assembly comprising:

a support plate having at least one projection formed along a portion of the periphery of said plate and means for securing said plate from movement;

a lever mechanism including an operating lever and a releasable lock, said operating lever having one end thereof pivotally mounted relative to said support plate and having both a stop means for pivoting said lever and a means for mechanical linkage to said door mechanism mounted on the opposite distal end whereby said door mechanism is moved to an operating position when said lever mechanism is pivoted in an operating direction, and said releasable lock including a pawl pivotally mounted to said lever mechanism and adjacent said support plate and means supported by said lever mechanism for biasing said pawl into engagement with said projection of said support plate when said lever mechanism is pivoted in an operating direction whereby said pawl maintains said lever mechanism and said door mechanism in the operating position until disengaged;

a handle pivotally mounted relative to said support plate and including a drive member adapted to abut and drive said stop means of said lever mechanism when said handle is pivoted in an operating direction thereby simultaneously pivoting said handle and said lever mechanism and engaging said pawl with said projection on said support plate, said handle being returnable to a non-operating position without disengaging said pawl from said projection; and means for disengaging said pawl from said projection, thereby releasing said lock and permitting said lever mechanism and said door mechanism to return to a non-operating position.

5. A combination according to claim 4 and further including spring means for biasing said handle of said lever assembly in a non-operating direction.

6. A combination according to claim 5 and further including means for biasing said headlamp door mechanism in a non-operating direction.

7. A combination according to claim 6 wherein said pawl of said lever mechanism is pivotally mounted to said operating lever at a point intermediate said pivoted end and said mechanical linkage means.

* * * * *